Patented June 20, 1933

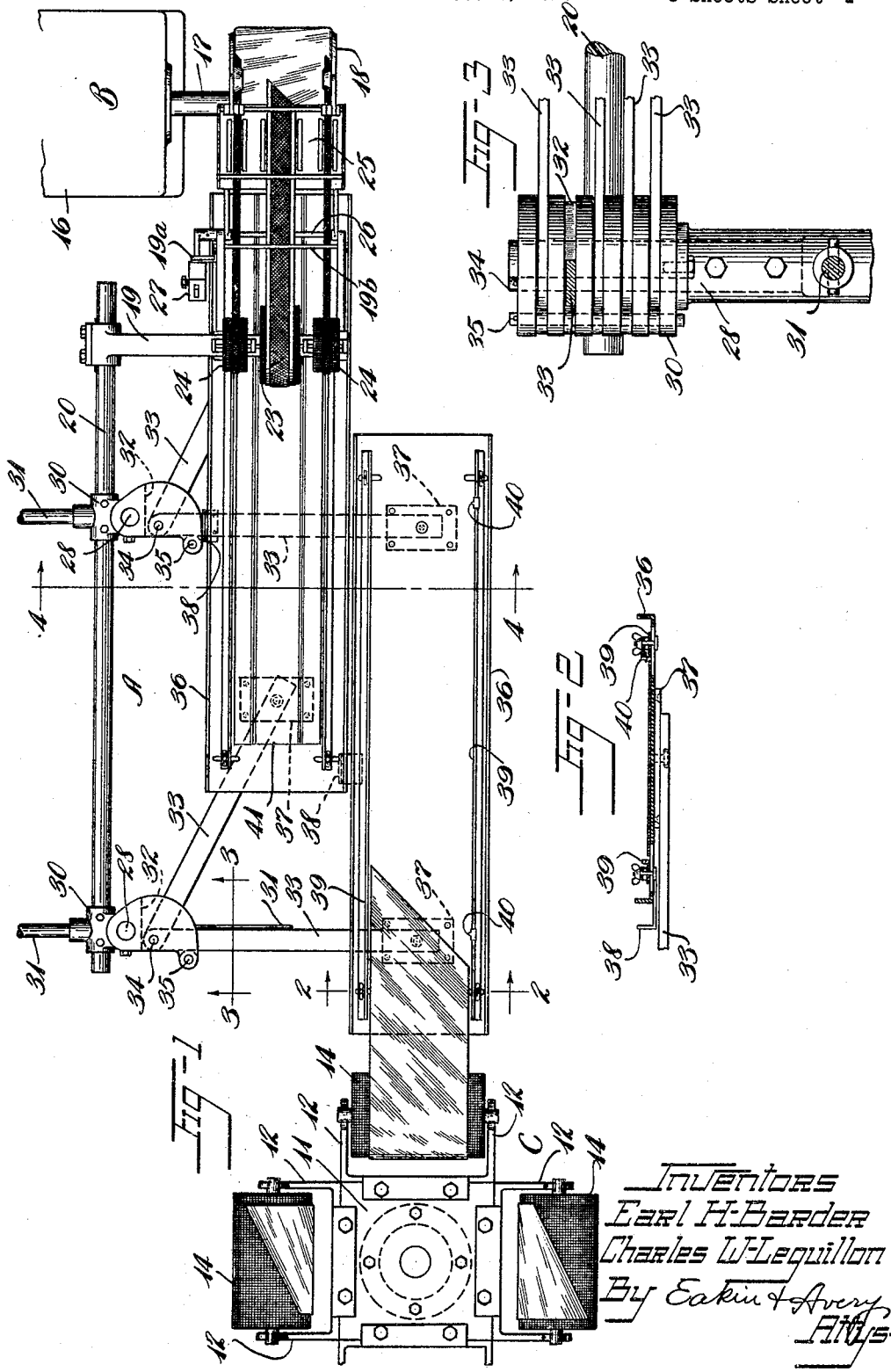

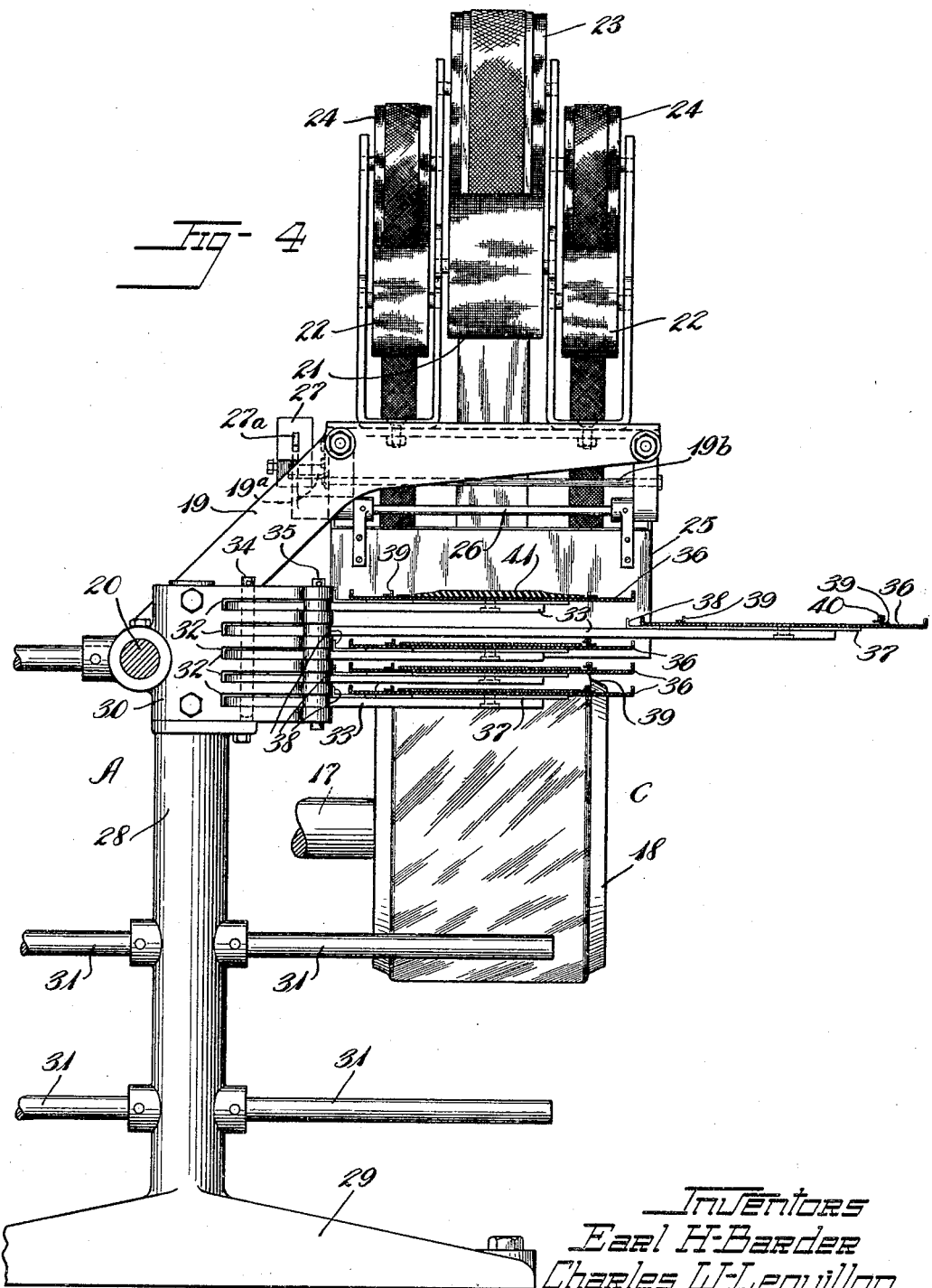

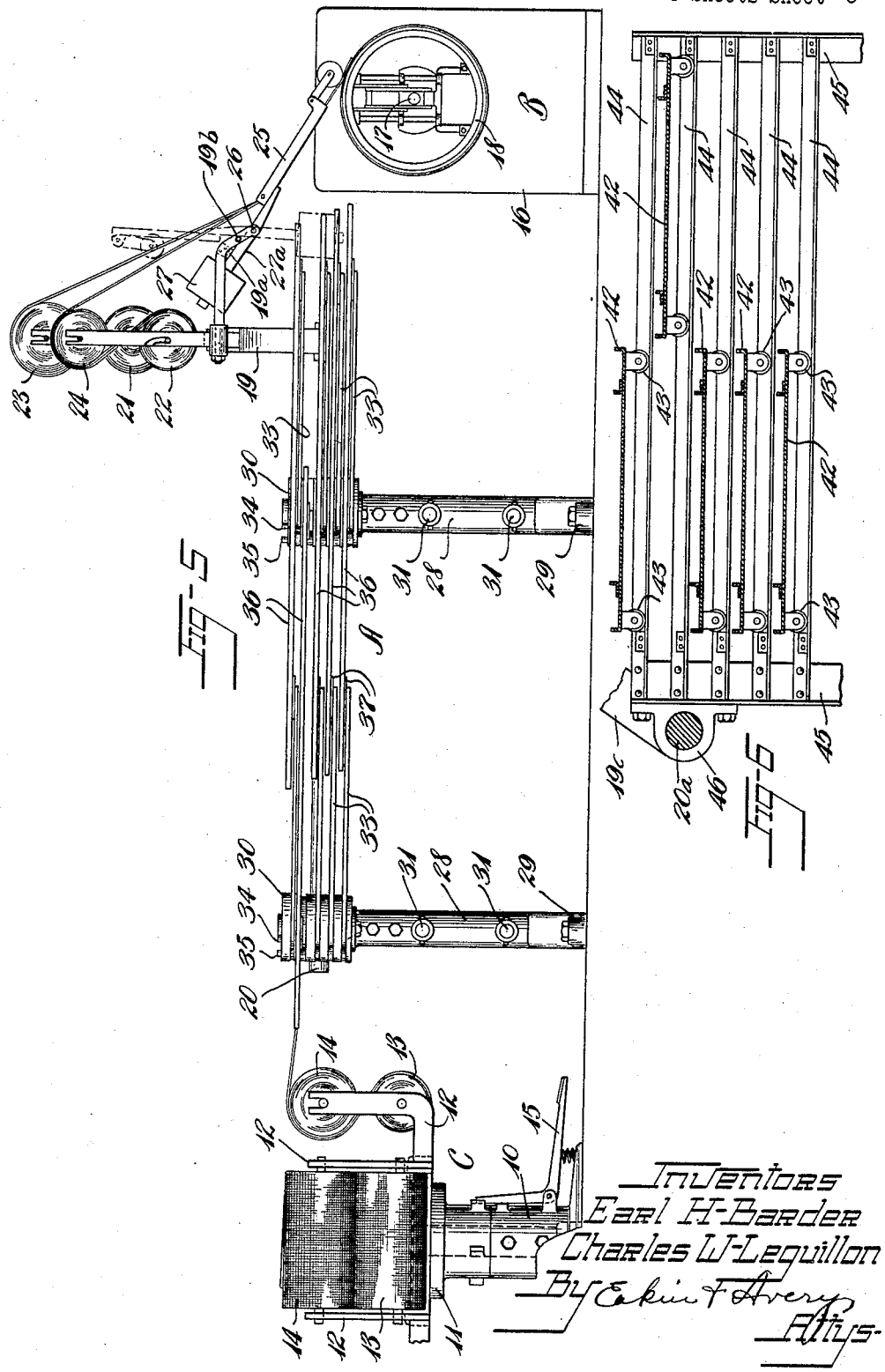

1,915,147

UNITED STATES PATENT OFFICE

EARL H. BARDER AND CHARLES W. LEGUILLON, OF AKRON, OHIO, ASSIGNORS TO THE B. F. GOODRICH COMPANY, OF NEW YORK, N. Y., A CORPORATION OF NEW YORK

TIRE BUILDING APPARATUS

Application filed December 3, 1929. Serial No. 411,258.

This invention relates to tire building apparatus, and more especially it relates to apparatus for preparing and delivering measured lengths of tire building material from a storage supply of the latter into convenient relation to a tire building machine.

The invention is especially useful in the manufacture of pneumatic tire casings by the drum-built or pulley-band method wherein the common practice is to withdraw rubberized fabric from a continuous length thereof which is wrapped in a roll with a liner and positioned adjacent the tire building machine. Because of adhesion of the liner to the tacky rubberized fabric, the latter is more or less stretched by the pull required to withdraw it, and, because of its immediate application to the tire-building drum, does not retract, with the result that tires of non-uniform quality are produced. Also, considerable care is required in drawing the fabric in accurate alignment onto the form.

In the practice of our invention the respective plies of tire building fabric are cut to length preferably by an operator other than the tire builder, at a sufficient interval before their application to the tire building form to permit them to retract to their normal unstretched condition, and are so positioned with relation to the tire building form as to be drawn thereonto by the rotation thereof without imposing material tension on the fabric.

The chief objects of the invention are to provide improved apparatus which will result in increased output from the tire building machines; to provide improved quality and uniformity of the tires produced; to provide conveniently for accurate alignment of the fabric on the form; and to utilize unskilled labor for numerous simple operations.

Of the accompanying drawings:

Fig. 1 is a plan view of apparatus embodying and adapted to carry out our invention, in its preferred form, and associated tire building apparatus.

Fig. 2 is a section on line 2—2 of Fig. 1.

Fig. 3 is a section on line 3—3 of Fig. 1.

Fig. 4 is a section on line 4—4 of Fig. 1.

Fig. 5 is a side elevation of the apparatus shown in Fig. 1 as viewed from the near side thereof.

Fig. 6 is a vertical section through a modification of the apparatus.

Referring to the drawings, the apparatus comprises a storage rack A for storing a plurality of lengths of tire building fabric, each length of which is adapted to form one ply of a tire, said storage rack being positioned between a tire building machine B and a supply of tire building material, for example, a supply rack C upon which is mounted long lengths of tire building fabric in rolls, said tire building machine and supply rack being disposed in offset or non-aligned relation, as shown in Fig. 1. However, we may dispense with the supply rack C and bring the tire building material to the storage rack A, in individual lengths upon an endless conveyor without sacrifice of all the advantages of our improved apparatus.

The supply rack C comprises a pedestal base 10 on which is mounted a rotatable turret 11 provided with suitable bracket-like supports 12, 12 on which are journaled a plurality of rolls 13, 13 of liner and tire building fabric, and liner wind-up rolls 14, 14 associated with the respective rolls 13. A foot-treadle 15 is provided for indexing the turret 11 to present successively the various rolls 13, which respectively contain lengths of fabric of different widths, at a determinate position.

The tire building machine B comprises the usual housing 16 having a rotatable spindle 17 extending therefrom and supporting, on its outer end, a collapsible tire building form or drum 18. A bracket 19 positioned at one side of and above the drum 18 is supported upon a horizontal bar or extension 20 of the storage rack A, and the bracket 19 provides journals for a roll 21 of breaker-strip fabric, rolls 22, 22 of bead-covering fabric at each side thereof, said rolls 21, 22 including liners interwound with the fabric, and liner rewinding rolls 23, 24, 24 for the rolls 21, 22, 22 respectively. The bracket 19 also pivotally supports a guide-structure 25 for the aforesaid fabric strips, said guide structure being mounted upon a pivoted bar 26, with its free end adapted to be positioned adjacent the drum 18 during the application thereto of said strips. The bar 26 is provided with a counterweight 27 which is somewhat lighter than the guide structure 25, said counterweight being adjustably mounted upon an arm 27$^a$ extending radially from bar 26. An abutment 19$^a$ projects from the bracket 19, and by engaging the arm 27$^a$ defines the operative position of the guide-structure 25, as is shown in full lines in Fig. 1. In inoperative position, the structure 25 rests in elevated position against a cross-rod 19$^b$, in over-center relation to the bar 26, as is clearly shown in broken lines in Fig. 1.

The storage rack A comprises a pair of spaced apart posts 28, 28 formed with suitable legs or base members 29, 29 and having their upper ends provided with respective brackets 30, 30 which support the bar 20, the latter imparting rigidity to the rack and also supporting the bracket 19 as hereinbefore described. Radial arms 31, 31 may be mounted on the posts 28 to provide convenient supports for stock trays and the like.

Each bracket 30 is formed with a laterally offset portion which is formed with a plurality of slots 32, 32, and radial arms 33 are pivotally mounted in the respective slots upon a vertical pivot-pin 34 extending through the bracket, the arms 33 thus being movable in a horizontal plane. A stop-pin 35 is mounted in the bracket 30 in such a manner as to traverse the slots 32 therein to provide a stop for the arms 33 in one direction, in which position the arms are disposed substantially perpendicular to the bar 20.

The arms 33 of the respective brackets 30 are of equal length, and provide supports for a plurality of elongate trays 36, 36 each tray being pivotally mounted upon the free ends of a pair of arms 33, one from each bracket 30, a spacer block 37 being positioned between each arm and the tray to reduce friction therebetween. The arrangement is such that any tray 36, being part of a parallel motion structure, may be aligned alternatively with the supply rack C and the drum 18 of the tire building machine B, independently of the other trays. A buffer plate 38 is mounted upon one margin of each tray 36, said plate abutting a bracket 30 when the tray is aligned with the drum 18, to limit the movement of the tray toward the drum. Each tray is provided with laterally-adjustable guides 39, 39 disposed longitudinally of the tray adjacent its lateral margins, and each guide 39 has a gauge or indicator 40 adjustably mounted thereon to enable the cutting operator accurately to position tire building material on the tray, and to indicate where the same is to be severed.

The number of trays provided with the device depends upon the tire building machine with which it is associated, or the tire to be built thereon, there being one tray for each fabric ply to be used in the tire and one tray for the tread slab. Preferably the racks of adjacent tire machines face each other so that but one operator is required for cutting and mounting the materials upon two racks.

In the operation of the apparatus the trays 36 are normally positioned in alignment with the tire building drum 18. The cutting operator pulls a tray from said position and swings it into alignment with the supply rack C, the turret of which is rotated by depressing the foot-treadle 15 to bring the proper supply roll 13 adjacent the end of said tray. The operator then pulls the fabric strip from the supply roll 13, properly positions its leading end by means of the gauge 40 at the far end of the tray, and then severs the fabric strip at the point indicated by the gauge 40 at the near end of the tray. He then swings the tray back into alignment with the tire building drum and repeats the operation with successive trays as they are emptied by the tire builder. A tread slab 41 usually is mounted in the upper tray. Thus the plies of fabric usually remain in the trays for several minutes before being incorporated in a tire, the interval being sufficient to permit the plies substantially to retract from any stretching incidental to their removal from the supply rolls 13.

The tire builder in using stock from the trays 36 only has to attach the adjacent end of a fabric strip to the drum 18 and then rotate the latter, the fabric strip thereby being withdrawn from the tray, substantially under no tension, and wrapped about the drum, the lateral guides 39 of the trays assuring the accurate positioning of the fabric upon the drum.

The invention assists the tire builder so that production from each tire machine is increased. It also results in lower cost of tires since unskilled labor may be employed for keeping the trays filled. Besides filling the trays, the unskilled workman finds time otherwise to assist the tire builder at simple tasks, such as moistening the ends of the tread slab with solvent, and applying adhesive labels to the tread slab, while it is in its tray. The parallel arrangement of the trays results in economy of space and so presents the strips that the tire builder is not required to bring them into alignment.

In the modification shown in Fig. 6, a plurality of trays 42, 42 are provided at their four corners with casters or rollers 43, 43 which run upon suitable flanges formed upon cross pieces 44, 44 of a suitable framework of which 45, 45 are the corner-posts. Brackets, such as the bracket 46, are mounted upon said framework at the rear thereof and support a bar 20$^a$ upon which is mounted a bracket 19$^c$, the latter being for the same purpose as the bracket 19 of the preferred structure. The structure described is positioned between the tire building machine B and the stock rack C in such a manner that the trays 42 are aligned with the latter when drawn forward, and aligned with the tire building machine when moved rearwardly.

The apparatus may be otherwise modified without departing from the scope of the appended claims, as we do not limit our claims wholly to the exact procedure described or the specific construction shown.

We claim:

1. Tire building apparatus comprising a storage rack adapted to be positioned between a tire building machine and a supply of tire building material, and a movable tray on said storage rack adapted to be positioned alternatively in alignment with said tire building machine and in receiving relation to said supply of material.

2. Tire building apparatus comprising a storage rack adapted to be positioned between a tire building machine and a supply of tire building material, and a movable tray pivotally mounted for limited movement on said storage rack and positionable in alignment with the tire building machine and in receiving relation to the supply of material.

3. Tire building apparatus comprising a storage rack adapted to be positioned between a tire building machine and a supply of tire building material, a pair of parallel pivoted arms extending from said storage rack, and a tray pivotally mounted upon the ends of said arms for movement into alignment with the tire building machine and into receiving relation to said supply of material.

4. Tire building apparatus comprising a storage rack adapted to be positioned between a tire building machine and a supply of tire building material, and a plurality of movable trays pivotally mounted on said storage rack and positionable alternatively in alignment with said tire building machine and in receiving relation to said supply of material.

5. A storage rack adapted to be positioned between a supply of material and apparatus for using the same, said rack comprising a movable tray adapted to be positioned alternatively in receiving relation to said supply of material and in delivering relation to said apparatus, and lateral guides on said tray.

6. A storage rack as defined in claim 5 including a gauge on one of the trays for indicating the positioning of material longitudinally of the tray.

7. Tire building apparatus comprising a plurality of individual trays, means for assembling individual lengths of tire-building material onto said trays at one station, means for conveying said trays to a second station, means for aligning said trays in superimposed relation with a tire-building form, and means for successively feeding the lengths of material onto said form.

In witness whereof we have hereunto set our hands this 25th day of November, 1929.

EARL H. BARDER.
CHARLES W. LEGUILLON.